United States Patent [19]

Chefalas et al.

[11] Patent Number: 5,121,441
[45] Date of Patent: Jun. 9, 1992

[54] ROBUST PROTOTYPE ESTABLISHMENT IN AN ON-LINE HANDWRITING RECOGNITION SYSTEM

[75] Inventors: Thomas E. Chefalas, Jackson Heights; Tetsunosuke Fujisaki, Armonk; Joonki Kim, White Plains; Charles C. Tappert, Ossining, all of N.Y.

[73] Assignee: International Business Machines Corporation, Armonk, N.Y.

[21] Appl. No.: 586,843

[22] Filed: Sep. 21, 1990

[51] Int. Cl.⁵ ............................................. G06K 9/46
[52] U.S. Cl. ........................................ 382/13; 382/14; 382/24
[58] Field of Search ............................ 382/3, 13–15, 382/10, 35, 24

[56] References Cited

U.S. PATENT DOCUMENTS

| | | | |
|---|---|---|---|
| 3,233,219 | 2/1966 | Atrubin et al. | 382/35 |
| 3,255,436 | 6/1966 | Gamba | 382/14 |
| 3,341,814 | 9/1967 | Ghow | 382/35 |
| 4,893,346 | 1/1990 | Bishop | 382/14 |
| 4,926,491 | 5/1990 | Maeda et al. | 382/10 |

Primary Examiner—Leo H. Boudreau
Attorney, Agent, or Firm—Perman & Green

[57] ABSTRACT

For use in a handwriting recognition system a method, and apparatus for accomplishing same, that includes the steps of (a) inputting a plurality of strokes each of which is a constituent stroke of a symbol or symbols to be recognized by the system; (b) forming from the inputted strokes a first set (CHR) comprised of one or more symbols; and (c) averaging at least one characteristic of similarly formed symbols that are members of the first set to form a second set (AVG) comprised of prototype symbols to which, during the use of the system, assemblages of input strokes are compared. The method further includes the steps of (d) identifying a symbol or symbols of the second set that corresponds to only a single symbol of the first set; and (e) deleting the identified symbol or symbols from the second set. The method further includes the steps of (f) decomposing into constituent strokes the prototype symbols of the second set; and (g) forming a third set (STK) comprised of the constituent strokes of the second set to which, during the use of the system, input strokes are compared.

24 Claims, 3 Drawing Sheets

FIG. 5

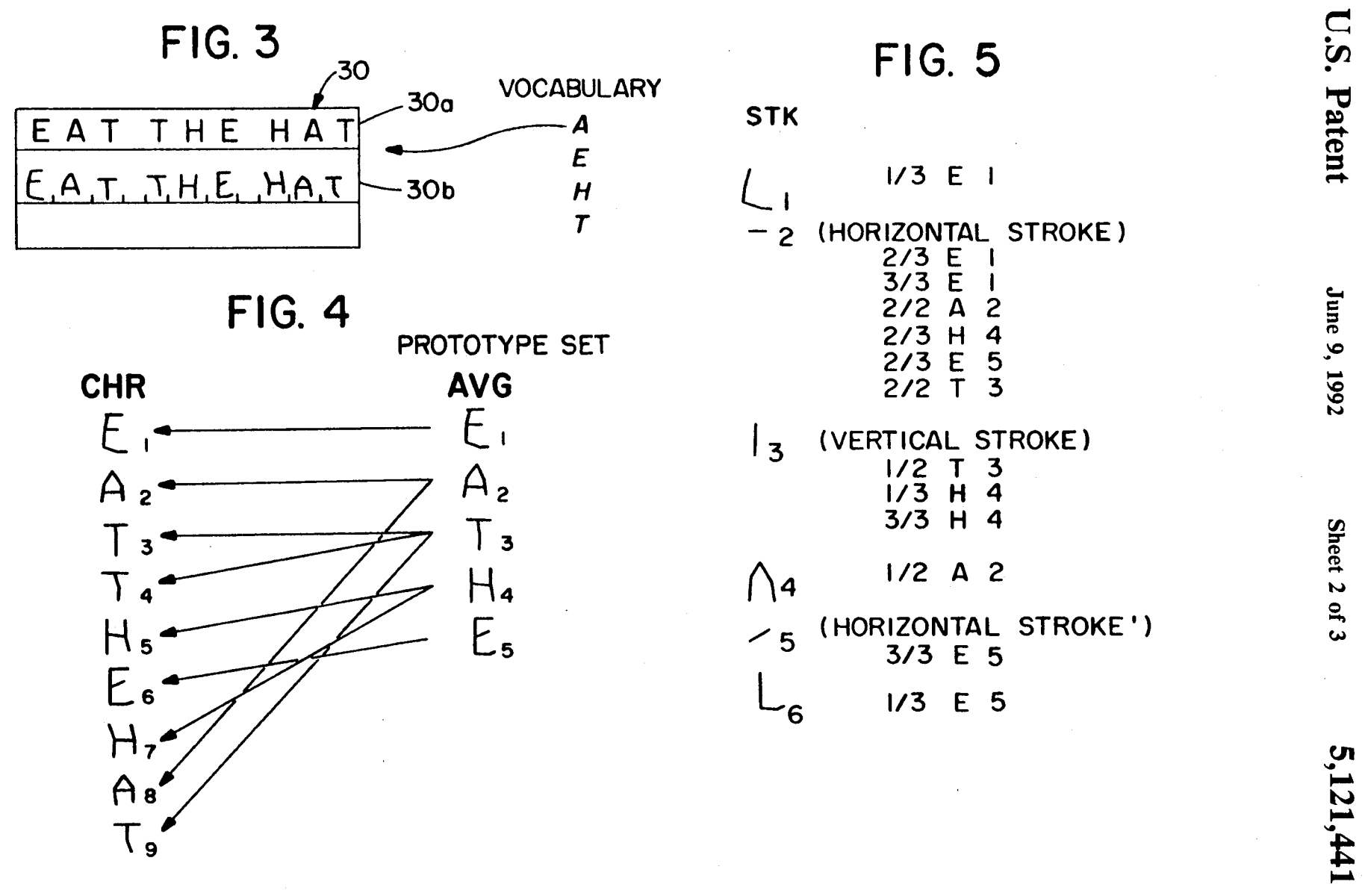

| STK | | |
|---|---|---|
| $L_1$ | 1/3 E 1 | (HORIZONTAL STROKE) |
| $-_2$ | 2/3 E 1 | |
| | 3/3 E 1 | |
| | 2/2 A 2 | |
| | 2/3 H 4 | |
| | 2/3 E 5 | |
| | 2/2 T 3 | |
| $I_3$ | 1/2 T 3 | (VERTICAL STROKE) |
| | 1/3 H 4 | |
| | 3/3 H 4 | |
| $\wedge_4$ | 1/2 A 2 | |
| $\diagdown_5$ | 3/3 E 5 | (HORIZONTAL STROKE') |
| $L_6$ | 1/3 E 5 | |

VOCABULARY
A
E
H
T

FIG. 4

PROTOTYPE SET

AVG: $E_1$ $A_2$ $T_3$ $H_4$ $E_5$

CHR: $E_1$ $A_2$ $T_3$ $T_4$ $H_5$ $E_6$ $H_7$ $A_8$ $T_9$

ROBUST PROTOTYPE ESTABLISHMENT IN AN ON-LINE HANDWRITING RECOGNITION SYSTEM

FIELD OF THE INVENTION

This invention relates generally to handwriting recognition systems and, in particular, relates to a method for establishing and managing a set of symbol and stroke prototypes.

BACKGROUND OF THE INVENTION

Symbols, such as handwriting, when traced on an electronic tablet are represented by sequences of x-y coordinate pairs. A fundamental unit of handwriting is the stroke. A stroke is considered as a sequence of points, represented by their respective x-y coordinates. As employed herein a stroke is considered to be the writing that occurs from a pen-down to a pen-up condition of a handwriting input device. Characters and symbols are assemblages of such strokes.

Many real-time handwriting recognition systems employ curve matching techniques in order to match an unknown input symbol against the members of a set of symbol prototypes or templates As such, the overall accuracy of the handwriting recognizer is a function of the quality of the prototype set while the speed of recognition is a function of the number of members of the prototype set that must be examined. It is therefore desirable to provide a prototype establishment procedure for use in a real-time recognition system that optimizes both handwriting recognition accuracy and speed. To achieve this goal the set of prototypes should exhibit the following characteristics.

Firstly, the set of prototypes should exhibit sufficient coverage. That is, the set of prototypes should contain a member that corresponds to each distinct manner of writing a given character or symbol. In this regard it is also desirable that the recognition process be capable of operating with variations between symbol expression. For on-line, or real-time, handwriting recognition the prototype set should ideally encompass variations in the number, order, direction and the shape of the constituent stroke or strokes that make up a given symbol.

Secondly, each member of the set of prototypes should embody a "good" representation of an acceptable manner of writing a corresponding symbol or character. That is, the set of prototypes should ideally be free of prototypes that result from aberrant, or "maverick", symbol expressions. As used herein a maverick is considered to be a piece of writing that is different than that intended by the writer.

Thirdly, the individual members of the set of prototypes should exhibit a sufficient degree of separation or distance from one another in a prototype "space" so as to reduce the processing burden of the recognizer in selecting the prototype from the set that most nearly matches the constituent stroke or strokes of the input symbol.

One prior art handwriting recognition system that uses the curve matching method mentioned previously is described in an article entitled "Word Processing with On-line Script Recognition" by W. Doster et al., IEEE Micro., vol. 4, pp. 36–43, 10/84. This article describes a segmentation process for handwritten characters. An input character is said to be compared only to reference characters having an identical number of connected-line segments (CLS). A CLS is said to be a string of coordinates generated while a stylus is in contact with a tablet. The authors state that an experimental program for on-line script recognition includes components for interpretation and presentation of intermediate results of various processing steps, and components for editing a reference symbol set.

Another prior art handwriting recognition system that uses the curve matching method is described in an article entitled "On-line recognition of hand-written characters utilizing positional and stroke vector sequences" by K. Ikeda et al., Proc. 4th Int. Jt. Conf. Pattern Recognition, pp. 813-815, 11/78. The authors describe the use of a spatial filter to obtain sampling data independent of the speed of pen movement and that rejects noisy data. Recognition of a stroke shape is accomplished by matching a stroke vector sequence against a shape dictionary. The authors employ a concept of similarity of stroke shape when matching input strokes to shapes in the dictionary and state that the number of strokes is a parameter for primary selection.

It is an object of the invention to provide a method to establish a set of character prototypes that provides sufficient coverage, adequate representation and sufficient separation one from the other to support the on-line, real-time operation of a character recognizer.

It is a further object of the invention to provide a method to interactively establish a set of character prototypes each of which is comprised of an average of similarly formed characters obtained from a training session, and to also establish a set of stroke prototypes each of which is comprised of an average of similarly formed strokes obtained from the set of averaged character prototypes.

SUMMARY OF THE INVENTION

The objects of the invention are realized by a method, and apparatus for accomplishing same, of generating sets of prototype symbols and strokes for use in a handwriting recognition system. The method includes the steps of (a) inputting a plurality of strokes each of which is a constituent stroke of a symbol or symbols; (b) forming from the inputted strokes a first set comprised of one or more symbols; and (c) averaging at least one characteristic of similarly formed symbols that are members of the first set to form a second set comprised of prototype symbols to which, during the use of the system, assemblages of input strokes are compared.

The method further includes the steps of (d) identifying a symbol or symbols of the second set that corresponds to only a single symbol of the first set; and (e) deleting the identified symbol or symbols from the second set.

The method further includes the steps of (f) decomposing into constituent strokes the prototype symbols of the second set; and (g) forming a third set comprised of the constituent strokes of the second set to which, during the use of the system, input strokes are compared. The step (g) of forming a third set includes a step of averaging at least one characteristic of similarly formed constituent strokes.

Further in accordance with the invention there is provided a method of establishing a set of symbol and stroke prototypes that includes a user interactively providing commands to and receiving information from a prototype manager function of a handwriting recognition system.

BRIEF DESCRIPTION OF THE DRAWING

The above set forth and other features of the invention are made more apparent in the ensuing Detailed Description of the Invention, when read in conjunction with the attached Drawing, wherein:

FIG. 3 depicts a training set of characters that is input to the system;

FIG. 4 depicts a set of the input training characters (CHR) and corresponding set of averaged prototype characters (AVG);

FIG. 5 depicts a set of averaged strokes (STK) generated from the AVG prototype set;

DETAILED DESCRIPTION OF THE INVENTION

Figure 1:
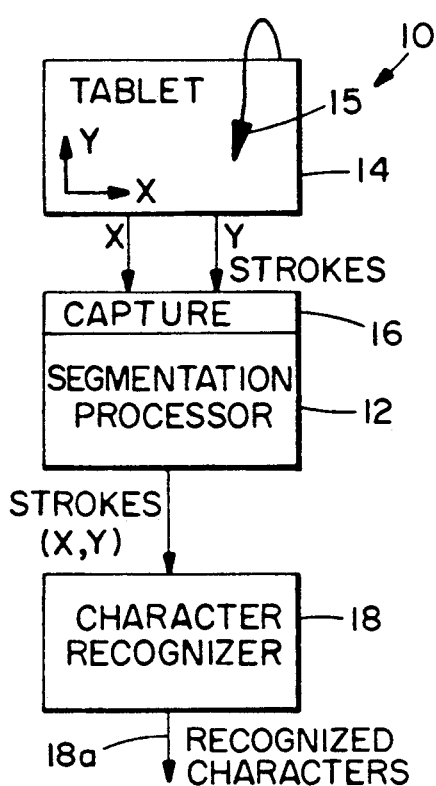
FIG. 1 is block diagram of a handwriting recognition system that operates in accordance with the invention.

Referring to FIG. 1 there is shown in block diagram form a character recognition system 10 that includes a segmentation processor 12 coupled between an electronic tablet 14 and a character recognizer 18. Tablet 14 can be any of a number of suitable commercially available electronic tablets. The tablet 14 has an associated stylus or pen 15 with which, in a pen-down position, a user forms symbols, such as block printing or script alphanumeric characters, on a surface of the tablet 14. The tablet 14 has x-axis and y-axis output signals expressive of the position of the pen 15 on an x-y tablet coordinate system. A stroke capture device 16 may be a software task which intercepts the x-y outputs from the tablet to generate x-y position pair data for the segmentation processor 12. An output of the segmentation processor 12 is data expressive of connected strokes and unconnected strokes. This output data is input to the character recognizer 18. The character recognizer 18 operates to determine an identity of a connected group of segmented strokes and has an output 18a expressive of identified symbols, such as alphanumeric characters. The present invention is directed to the operation of the character recognizer 18.

Although shown as separate functions it should be realized that the segmentation processor 12, capture device 16 and character recognizer 18 may all be embodied as program modules running upon a single data processing system. Presently preferred hardware platforms include an IBM RT-PC running under AIX and an IBM PS/2 running under OS/2 (IBM, RT-PC, PS/2, AIX and OS/2 are all registered trademarks of the International Business Machines Corporation).

It should also be realized that the teaching of the invention is applicable to the recognition of a number of handwritten symbols wherein a given symbol is composed of at least one stroke. By employing the teaching of the invention the system 10 may readily recognize symbols associated with written characters of various languages and also mathematical and other types of symbols.

Figure 2:
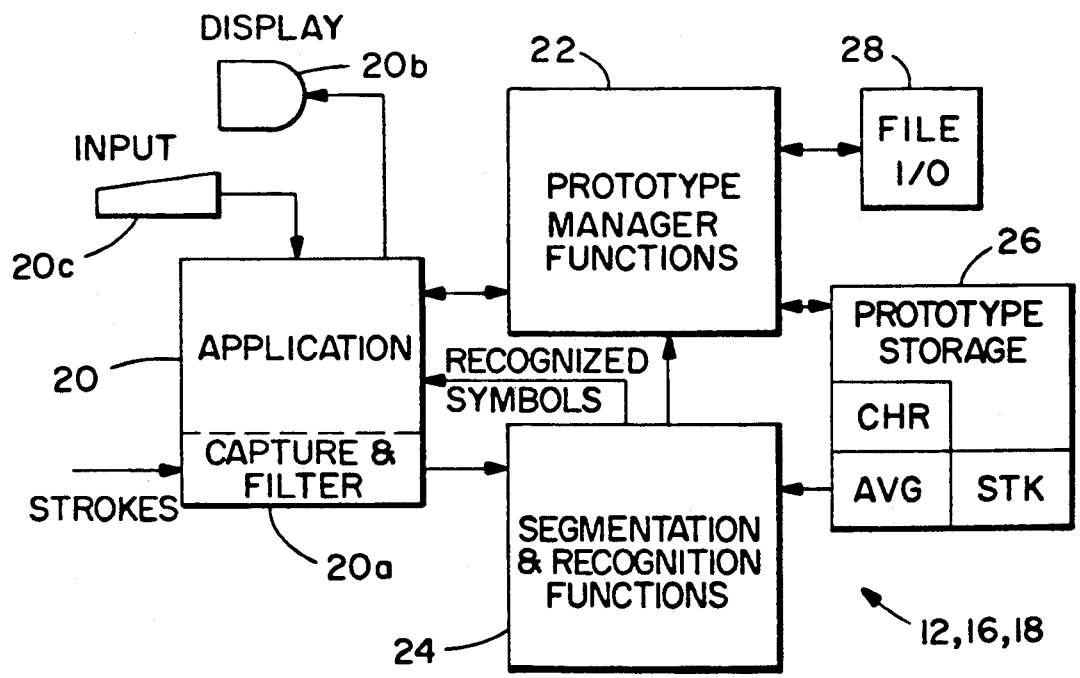
FIG. 2 is a block diagram that illustrates in greater detail the character recognizer 18 of FIG. 1.

Referring now to FIG. 2 there is shown in block diagram form an embodiment of the system 10. A character recognition function 24 is bidirectionally coupled during use to an application program 20 to which it supplies recognized characters 18a and through which strokes from the tablet 14 are passed. Depending upon the function of the application program 20 the application program may also contain a filter 20a for selectively passing strokes to the recognition function 24. By example, for a text editing application handwritten symbols that are positioned within a body of text may be considered to be textual insertions while symbols appearing within a margin area may be considered to indicate editing functions or comments. The application 20 may pass to the recognizer 24 only the strokes associated with what is assumed to be inserted text while filtering out the strokes associated with assumed editing functions. In general, the application program 20 may be any program that utilizes or otherwise consumes the recognized characters. In accordance with one aspect of the invention during character and stroke prototype establishment the application program 20 operates to interact with a prototype manager 22, as described below.

System 10 includes the aforementioned recognition function 24 that operates to compare input strokes from the segmentation processor 12 to prototype strokes and characters stored within a local, on-line prototype storage device 26.

Prototype manager 22 is comprised of a data base manager and an associated collection of functions used for establishing stroke and character prototype sets. The functionality of the prototype manager 22 is invoked by an application 20 employed during prototype generation and maintenance. Prototype manager 22 operates to control the prototype storage 26 and an associated file input/output (I/O) 28 that provides access to off-line storage and retrieval of the prototype sets.

Prototype manager 22 operates, under control of the application 20, to create, edit and delete prototypes and to execute prototype query functions. In a presently preferred embodiment the prototype manager is comprised of a plurality of functions written in the C-programming language, the functions being invoked by an operator though the application 20. These prototype manager 22 functions are described below. In this embodiment the application 20 functions as an operator interface to the prototype manager 22, the application 20 further being coupled to an operator display terminal 20b and an operator input device, such as a keyboard 20c.

Prototype manager 22 also operates to compress and optimize prototypes by performing prototype averaging, stroke breaking and stroke grouping. These various operations of the prototype manager 22 are also described in detail below.

FIG. 3 depicts an example of an input training form 30 employed for providing input to the prototype manager 22. During a training session for an exemplary vocabulary, consisting of the characters "A", "E", "H" and "T", a subject is provided with a training sample 30a. The subject writes with the stylus 15 upon the tablet 14 the individual labeled symbols of the training sample 30a to create a plurality of strokes that make up handwritten characters 30b. The strokes are captured, segmented and provided to the recognition function 24. During a typical training session wherein the characters 30b do not touch, or "run-on", the recognition function 24 inputs the strokes and performs default character recognition based on the known labels of the training sample 30a, and provides recognized characters to the prototype manager 22 for storage and processing. However, if the characters 30b are written such that they do run-on the recognizer can also employ any already existing prototypes in order to separate the run-on characters and associate them with the known labels.

FIG. 4 depicts, under the column "CHR", nine characters from the training input of FIG. 3, the characters being sequentially ordered from top to bottom in order as received. Each CHR character is represented by a data structure that includes information expressive of the character label, the number of strokes in the character, an identification number, a typical upper-case character height in tablet 14 coordinate units, an associated baseline value expressed in tablet 14 coordinate units, the tablet 14 resolution and sample rate, and also the number of x-y coordinate pairs, or points, associated with each stroke. The data structure also includes a plurality of x-y coordinate values, referenced to the tablet 14 coordinate system, for each of the strokes. The coordinate pair values are received from the tablet 14.

In the column labeled "AVG" are five resultant members of the prototype set produced by the prototype manager 22 from the nine input CHR characters. In accordance with an aspect of the invention the prototype manager 22 averages one or more stroke characteristics, preferably the x-y values of corresponding stroke points, of each stroke of the CHR characters that are identified by their associated labels as representing the same character. These averaged character prototypes comprise the set of AVG prototypes. As described below, another consideration in selecting CHR characters for averaging is that CHR characters having the same label also be similar in shape.

For example, only one character is recognized for the first CHR character and no averaging is performed when generating the first AVG prototype character. CHR characters two and eight are averaged to provide the second AVG prototype character. CHR characters three, four and nine are averaged to generate the third AVG prototype character and CHR characters five and seven are averaged to generate the fourth AVG prototype character.

The fifth AVG prototype character corresponds to the sixth CHR character. It can be seen that AVG characters one and six each represent the character "E" and each have the same label. However, differences in stroke formation or some tablet 14 induced distortion results in a failure of an elastic matching technique, described below, to match the two characters to within a threshold error value. Thus, although both CHR characters one and six have the same label, they are associated with different AVG prototypes.

With a limited training set either of the two CHR characters may be considered to be a "maverick" character. It is sometimes desirable to eliminate one of the two corresponding AVG prototypes to prevent a subsequent degradation in the operation of the character recognition function 24 when processing segmented strokes that are not associated with a known training sample. Elimination of AVG prototypes that correspond to maverick CHR characters is described below.

The averaging is performed on a stroke by stroke basis. One method of averaging is a linear method wherein each stroke from the CHR set that is to be averaged is resampled to a fixed number of points and corresponding points from two or more strokes are averaged together. A presently preferred embodiment of the invention employs an elastic matching technique of a type described by Charles C. Tappert in "Adaptive on-line handwriting recognition", Proc. 7th Int. Conf. Pattern Recognition, pp. 1004-1007, 1984. The elastic matching technique determines the appropriate correspondence of the original points without resampling. The corresponding original points are then averaged.

Figure 7:
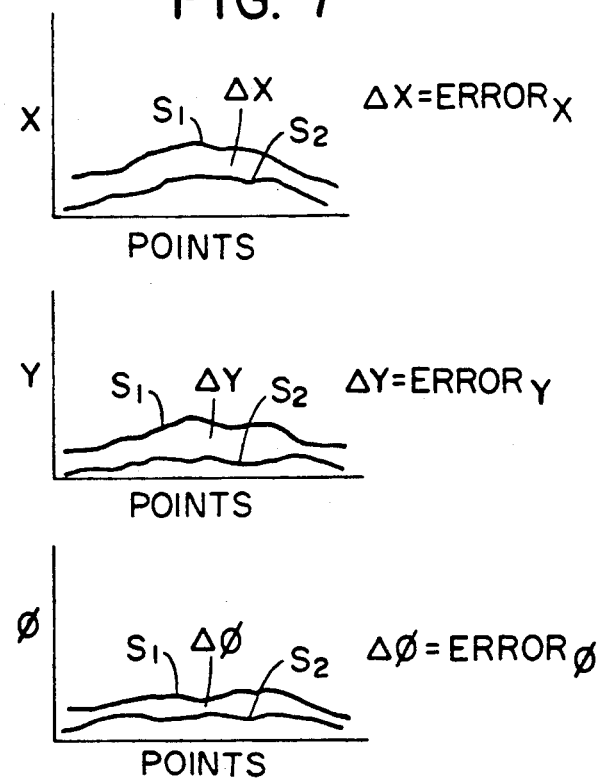
FIG. 7 graphically depicts the operation of comparing corresponding strokes associated with symbols of the same symbol label to determine a degree to which the two symbols or strokes are similarly shaped.

FIG. 7 graphically illustrates three stroke characteristics, specifically x, y and phi, plotted over a length of each of two strokes ($S_1$ and $S_2$) being compared by the elastic matching technique. Phi is the slope angle of the tangent to the stroke curve and is obtained from the x-y data. If the difference, or error, between the two curve points exceeds an empirically determined threshold value the two strokes, and possibly the two characters of which the two strokes are constituents, are considered to be sufficiently distant from one another so as to be considered non-matching.

The AVG prototype characters are each represented with a data structure that is substantially identical in form to that described above for the CHR characters. One significant difference, however, is in the content of the data structure in that the values of the x-y coordinate pairs for the constituent strokes are obtained from the averaging technique and not from the raw user input.

Further in accordance with the invention the characters of the AVG set are subsequently broken or decomposed into six constituent strokes (STK) as shown in FIG. 5. The AVG prototype set and the STK prototype set are stored in prototype storage 26 for use by the recognition function 24 as character and stroke prototypes, respectively. Off-line storage of the prototype sets is also provided via file I/O 28.

The averaged strokes of the STK set are employed by the recognition function 24 during the character recognition process. A stroke input from segmentation processor 12 is compared with the set of stored STK prototypes, each of which corresponds to a fragment of a symbol such as "½ A". As employed herein the convention for the notation "½ A" indicates the first stroke of two strokes (½) of the upper case character "A". Similarly, the notation "3/3 H" indicates the third stroke of three strokes of the character "H" while, although not represented in the depicted training sample 30a, "1/1 C" indicates the first, and only, stroke of the upper case character "C".

For the example depicted in FIG. 5 stroke number one is associated with the first stroke of the first AVG character (E1). Stroke two is associated with the second stroke of (E1), the third stroke of (E1), the second stroke of (A2), the second stoke of (H4) and the second stroke of (E5). STK one and six can be seen to be differently formed and, although both are intended to represent the first stroke of "E", are associated with the first strokes of (E1) and (E5), respectively.

During use by the recognition function 24 each generated input stroke has associated therewith a "score" or value for indicating the degree of dissimilarity between the input stroke and one of the corresponding stroke prototypes of the STK set. Input strokes are compared to the STK prototypes and are built up into assemblages of strokes that are compared to the AVG prototypes to select a character that most probably corresponds to the assemblage of strokes. A recognized character 18a is subsequently output to the application 20 for further processing. A presently preferred technique for generating the recognized characters 18a is disclosed in commonly assigned U.S. patent application Ser. No. 07/474,271, filed Feb. 2, 1990, entitled "Constraint Driven On-Line Recognition of Handwritten Characters and Symbols" by Tetsunosuke Fujisaki.

Although only a limited training vocabulary is depicted in FIG. 3 in practice the object of obtaining adequate prototype coverage is achieved by collecting a significant number of character prototypes from writing samples generated from a specific user of the system 10. Complete prototype coverage is provided by training over a training set that includes all expected character input and by also periodically updating the prototype set with additional handwriting input.

The object of providing sufficient prototype representation is achieved by averaging together a number of similarly written characters in order to represent a distinct variation of a character. The AVG prototypes are formed by averaging together, within a predetermined matching threshold, CHR characters of the same stroke label, number of strokes and that are similarly shaped to within a predetermined threshold. For example, the two similarly-shaped two stroke "A" characters, (CHR2) and (CHR8), are averaged to yield one prototype (AVG 2) while the two differently shaped "E" characters, (CHR1) and (CHR6), are not averaged together and generate two prototypes (AVG1) and (AVG5). In general, the averaged prototype characters are more regularly shaped than any of the associated CHR characters. The averaging function may be performed either globally or incrementally, as defined below.

A global averaging method is performed by prototype manager 22 on a global basis over the entire set of CHR characters while ignoring a matching distance to neighboring characters having different character labels. That is, all CHR training characters having the same character label, and that are written similarly, are averaged together in a stroke-wise manner.

The incremental averaging method processes each CHR training character sequentially. A CHR character is added to the AVG prototype set if it is associated with a new label or if it is not within a threshold value of other AVG characters of the same label that are already in the set. Otherwise, the character is averaged into the closest prototype character having the same label. This method takes into account the matching distance to similar characters having different labels and also more liberally creates prototypes for different characters that are similarly shaped, such as "U" and "V" or "A" and "H". Furthermore, a reduced storage requirement is obtained over the global method in that it is not required to store the entire CHR set. Instead, averaging is performed by a weighted averaging technique as the CHR characters are sequentially received. That is, a record is maintained of the number of CHR characters already averaged into the AVG prototype and the AVG prototype is weighted by that number when being averaged with a new CHR character. Thus, a later-formed CHR character of less than optimum shape will not unduly bias the corresponding prototype.

It should be noted that although there is no requirement that the CHR characters be retained when incrementally averaging; in practice there are advantages in retaining the CHR training set. For example, one prototype manager function (Orig) that is described below displays to the user the CHR character or characters that resulted in a specified AVG prototype. As such, this function relies on the CHR characters being available after the averaging process is begun or is complete and can be successfully invoked only if the CHR characters are retained and stored.

In accordance with further aspects of the invention the averaged set of AVG character prototypes are further processed by the prototype manager 22 to generate the STK prototypes. This further processing involves a method of breaking, or decomposing, the AVG character prototypes into their constituent strokes, it being remembered that the constituent strokes are individually represented within the aforementioned data structure associated with each AVG prototype. By example, the AVG prototype (H4) is broken into constituent stroke labels ½H, ⅔H, and 3/3H and the corresponding averaged x-y coordinate information for each stroke label is represented within the STK prototype set.

The prototype manager 22 operates to further optimize the STK set by a stroke grouping or clustering technique that averages similarly-shaped strokes having different stroke labels. For example, the vertical stroke prototype (STK 3) has stroke labels for indicating the vertical stroke or strokes of the characters T and H. For this case the vertical stroke of each of these characters is combined and averaged with all other vertical strokes to yield a single "vertical stroke" labeled stroke prototype to which the input strokes are compared. Similarly, the horizontal stroke or strokes of characters E, A, H and T are combined and averaged to generate a "horizontal stroke" labeled stroke prototype. A "horizontal stroke," labeled stroke prototype results from the third of three strokes of AVG E 5. After further training with an expanded vocabulary the "vertical stroke" label would also be associated with, for example, ½B, ½D, ½N, 3/3N, and so forth.

Stroke grouping beneficially serves to reduce the overall number of required STK prototypes that are required to be examined and thus also proportionally reduces the amount of subsequent stroke matching computation required by the recognition function 24.

The aforedescribed maverick CHR characters are preferably avoided. This is accomplished by processing the AVG set of characters to identify AVG prototype characters resulting from only one CHR character. These identified AVG characters are also referred to as "outliers". An outlier is considered to be a unique piece of writing that is different from other writings as determined by the distance measure. Any AVG outlier may, but not necessarily will, correspond to a maverick CHR character. As the set of training characters increases the probability that an AVG outlier corresponds to a CHR maverick increases. One presently preferred technique for eliminating AVG outliers is to identify and retrieve same from the prototype storage 26 with the prototype manager 22. Prototype manager 22 provides the AVG outliers to a prototype editor application 20 for display to a user of the system 10. The user is enabled to review the outliers and, through the operation of the prototype manager 22, to delete some or all outliers from the AVG prototype set.

The object of prototype separation is thus also accomplished interactively. The above mentioned prototype manager user interface application 20 is invoked to compute distances between the AVG prototypes and to display to a user pairs of prototypes that are found to be separated by a predetermined minimum distance. For many close pairs corrective action may include deleting one of the AVG prototypes. For example, for the AVG pair E1 and E5 a user may choose to delete one of the two prototype characters from the AVG set. Also, the interactive processing of the AVG set can be employed to ensure that two close prototypes, such as an upper case "O" and a zero "0", are distinguishable. In this regard the user is prompted to reenter one or more CHR characters and to intentionally form the character so that it differs sufficiently from the other character of the close pair. For the case of zero and upper case "O" this can be achieved by simply overstriking the zero (0). This process continues interactively until all close AVG prototypes are sufficiently spaced apart from one another to avoid confusion during use.

The aforedescribed functions of the prototype manager that are invoked by the user via the user interface application 20 are now described in greater detail. In reviewing the functions it should be noted that several AVG and STK prototype sets may be created, maintained and used by the system 10, each AVG/STK prototype corresponding to a different user, or writer.

| FUNCTION | PURPOSE |
| --- | --- |
| Clear | Remove all prototype sets from the storage 26. |
| Load | Load a specified prototype set via file I/O 28 to storage 26. |
| Save | Save a specified prototype set via file I/O 28 to off-line storage. |
| Drop | Remove a single specified prototype set from storage 26. |
| Sort | Sorts the specified AVG prototype set by label; "alphabetizes" the set. |
| Copy | Copies the specified prototype set into a newly created set. |
| Create | Create a new, empty prototype set. |
| Rescale | Allows a new tablet 14 line spacing to be specified for a prototype set. All x- and y- coordinates of stroke points contained within the set are recalculated. |
| Append | Merge the prototypes from one specified set into a second specified set. |
| Average | Perform global averaging and global stroke grouping of a specified prototype set. |
| Vocab | Display the vocabulary (alphabet) of a specified prototype set. |
| Results | Display results after recognition. |
| Renumber | Renumber a set, changing prototype IDs. |
| Brk/Grp | Performs global stroke breaking and grouping on a specified AVG prototype set to create a corresponding STK prototype set. |
| Orig | Display originals (CHR set) for a specified AVG prototype. |
| Near | Display nearest neighbors (closest prototypes) of a specified prototype. |
| Getproxy | Display prototype xy segmentation statistics for a prototype set. |
| Incr Avg | Performs incremental averaging of original labeled writing samples (from a CHR file specified by the user) into a specified prototype set to create an averaged (AVG) and stroke grouped (STK) prototype set. |
| QUIT | Exit from the prototype manager 20. |

Initial use of the system 10 is achieved by at least two methods. A first method involves establishing the AVG and STK prototype sets by training with an individual user, as described above. A second method involves loading from file I/O 28 into prototype storage 26 a generalized prototype "starter set". The starter set is generated to provide acceptable limits of prototype coverage, representation and separation. Coverage is obtained by providing a set of statistically determined most common forms of written characters. Representation and separation are obtained by careful prototype construction from the set of common representations.

In this regard it has been found that intentional exaggeration of differences between similar characters enhances separation and increases recognition accuracy. That is, portions of a character that are known to be critical for accurate recognition are intentionally exaggerated while unimportant features that are common to two close characters are intentionally written in the same fashion. For example, during the generation of a starter set that includes the close character pair "g" and "y" the closure of the top of the "g" is emphasized while the tails, or descenders, of the two characters are formed substantially the same so as to de-emphasize this feature. A user of the system who is writing training characters can also be instructed via display 20b to modify her formation of certain characters to accomplish the same goal of generating prototypes that are unequivocally distinguishable from one another.

If required, the prototype sets AVG and STK are maintained through the use of subsequent training sets of characters to supplement the starter prototype set in order to further increase prototype coverage.

Figure 6:
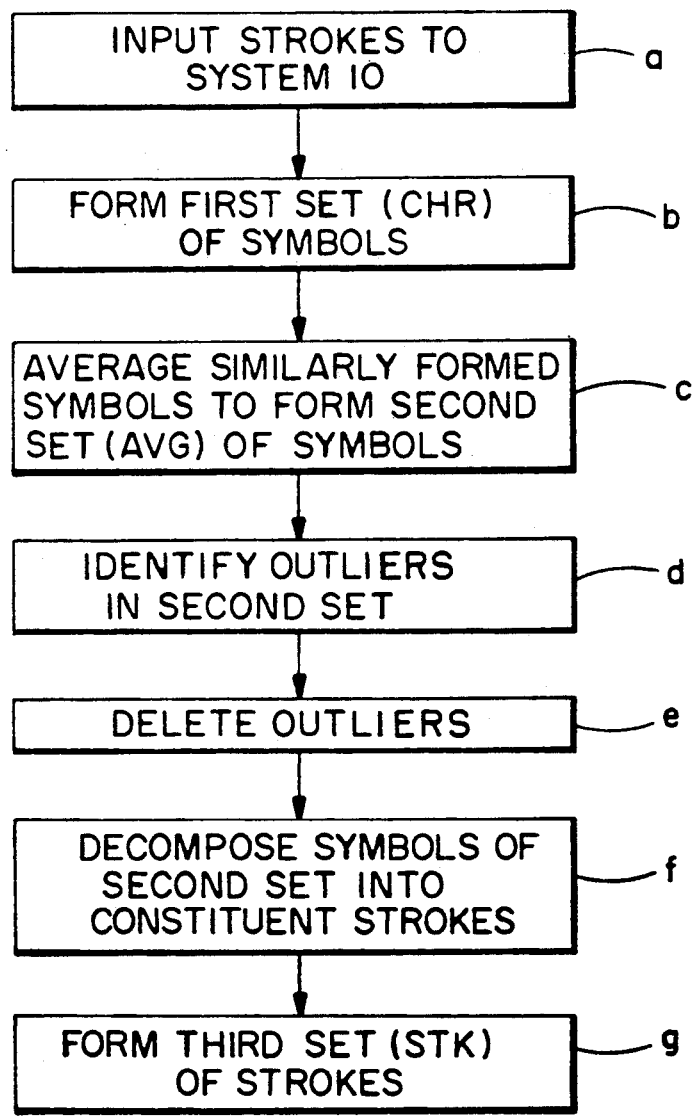
FIG. 6 is a flow chart that illustrates a method of the invention.

A method of the invention is depicted in the flow chart of FIG. 6. The method illustrated therein includes the steps of (a) inputting a plurality of strokes each of which is a constituent stroke of a symbol or symbols used to train the system; (b) forming from the inputted strokes a first set (CHR) comprised of one or more symbols; and (c) averaging at least one characteristic of similarly formed symbols that are members of the first set to form a second set (AVG) comprised of prototype symbols to which, during the use of the system, assemblages of input strokes are compared.

The method further includes the steps of (d) identifying a symbol or symbols of the second set that corresponds to only a single symbol of the first set; and (e) deleting the identified symbol or symbols from the second set.

The method further includes the steps of (f) decomposing into constituent strokes the prototype symbols of the second set; and (g) forming a third set (STK) comprised of the constituent strokes of the second set to which, during the use of the system, input strokes are compared. The step (g) of forming a third set includes a step of averaging at least one characteristic of similarly formed constituent strokes.

The steps of (d) and (e) are preferably accomplished before the steps of (f) and (g) to prevent the inclusion of strokes associated with unwanted outliers within the STK prototype set.

The step of inputting (a) includes a step, in one embodiment of the invention, of generating strokes by the movement of a stylus relative to a tablet. In another embodiment of the invention the step of inputting (a) includes an initial step of generating a data structure comprised of a plurality of strokes having predetermined shapes and subsequently providing the data structure for input.

It should be realized that the method described may be practiced with a number of suitable hardware embodiments including but not limited to general purpose or dedicated processing devices and/or may be wholly or partially implemented with dedicated circuitry. Also, certain steps of the method may be performed in other than the order illustrated while still obtaining the same result. For example, the steps (d) and (e) may be executed after or contemporaneously with the steps (f) and (g), although some degradation of the quality of the STK set may be experienced if the AVG set contains one or more outliers that correspond to maverick CHR characters.

Thus, while the invention has been particularly shown and described with respect to a preferred embodiment thereof, it will be understood by those skilled in the art that changes in form and details may be made therein without departing from the scope and spirit of the invention.

Having thus described our invention, what we claim as new, and desire to secure by Letters Patent is:

1. A method of generating a set of prototype symbols for use in a handwriting recognition system, comprising the steps of:
   inputting a plurality of strokes each of which is a constituent stroke of a symbol or symbols;
   forming from the inputted strokes a first set comprised of one or more symbols;
   averaging at least one characteristic of similarly formed symbols that are members of the first set to form a second set comprised of prototype symbols to which, during the use of the system, assemblages of input strokes are compared;
   decomposing the prototype symbols of the second set into constituent strokes; and
   forming a third set comprised of the constituent strokes of the second set to which, during the use of the system, input strokes are compared.

2. A method as set forth in claim 1 wherein the step of forming a third set includes a step of averaging at least one characteristic of similarly formed constituent strokes of the second set of prototype symbols.

3. A method as set forth in claim 1 wherein the step of decomposing includes the initial steps of:
   identifying a symbol or symbols of the second set that correspond to a maverick symbol of the first set; and
   deleting the identified symbol or symbols from the second set.

4. A method as set forth in claim 1 wherein the step of inputting includes a step of generating strokes by the movement of a stylus relative to a tablet.

5. A method as set forth in claim 1 wherein the step of inputting includes an initial step of generating a data structure comprised of a plurality of strokes having predetermined shapes for defining a predetermined number of symbols, and wherein the step of inputting further includes a step of providing the data structure for input.

6. A method as set forth in claim 1 wherein the step of averaging includes a step of globally averaging at least x-axis and y-axis coordinate data of points that make up constituent strokes of all similarly shaped symbols of the first set that also have a same symbol label.

7. A method as set forth in claim 1 wherein the step of averaging includes a step of incrementally averaging at least x-axis and y-axis coordinate data of points that make up constituent strokes of a single symbol of the first set with a member of the second set having a same symbol label.

8. A method as set forth in claim 1 wherein the step of averaging includes an initial step of determining if a symbol to be averaged has a shape that is within a predetermined threshold of the shapes of other symbol having a same symbol label, the step of determining being accomplished by an elastic matching technique.

9. A method as set forth in claim 1 wherein the steps of averaging, decomposing and forming are initiated in response to a command from a user of the system.

10. A method of generating a set of prototype symbols and prototype strokes for use in a handwriting recognition system, comprising the steps of:
    providing a user of the system with means for interacting with a prototype manager function of the system;
    responsive to input from the user,
    inputting a plurality of strokes each of which is a constituent stroke of a system training symbol or symbols;
    forming from the inputted strokes a first set comprised of one or more symbols;
    responsive to a command from the user activating the prototype manager function
    averaging at least one characteristic of similarly formed symbols that are members of the first set to form a second set comprised of prototype symbols to which, during the use of the system, assemblages of input strokes are compared;
    responsive to further commands from the user activating the prototype manager function
    identifying a symbol or symbols of the second set that correspond to a maverick symbol of the first set;
    displaying to the user the maverick symbol or symbols; and
    deleting specified ones of the identified symbol or symbols from the second set; and
    responsive to a further command from the user activating the prototype manager function
    decomposing the remaining prototype symbols of the second set into constituent strokes;
    averaging at least one characteristic of similarly formed constituent strokes; and
    forming a third set comprised of the average constituent strokes of the second set to which, during the use of the system, input strokes are compared.

11. A method as set forth in claim 10 and responsive to a further command from the user activating the prototype manager function for storing at least the second and the third prototype sets for subsequent use by the system.

12. A method as set forth in claim 10 and responsive to a further command from the user activating the prototype manager function to display to the user any members of the second set having characteristics that are similar to one another to within a predetermined threshold; and, responsive to further input from the user, modifying one of the displayed members of the second set to unequivocally distinguish the two displayed members one from the other.

13. Handwritten character recognition apparatus comprising:
    means for inputting a plurality of strokes each of which is a constituent stroke of a symbol or symbols selected for training the system;
    means for forming from the inputted strokes a first set comprised of one or more symbols;
    means for averaging at least one characteristic of similarly formed symbols that are members of the first set to form a second set comprised of prototype symbols to which, during the use of the apparatus, assemblages of input strokes are compared;
    means for decomposing the prototype symbols of the second set into constituent strokes; and means for forming a third set comprised of the constituent strokes of the second set to which, during the use of the apparatus, input strokes are compared.

14. Apparatus as set forth in claim 13 wherein the means for forming a third set includes means for averaging at least one characteristic of similarly formed constituent strokes of the second set of prototype symbols.

15. Apparatus as set forth in claim 13 wherein the means for decomposing includes:
   means for identifying a symbol or symbols of the second set that correspond to a maverick symbol of the first set; and
   means, responsive to an command from a user of the system, for deleting the identified symbol or symbols from the second set.

16. Apparatus as set forth in claim 13 wherein the means for averaging includes means for globally averaging at least x-axis and y-axis coordinate data of points that make up constituent strokes of all similarly shaped symbols of the first set that also have a same symbol label.

17. Apparatus as set forth in claim 13 wherein the means for averaging includes means for incrementally averaging at least x-axis and y-axis coordinate data of points that make up constituent strokes of a single symbol of the first set with a member of the second set having a same symbol label.

18. Apparatus as set forth in claim 13 wherein the averaging means includes means for comparing symbols by an elastic averaging technique to determine if two symbols having a same symbol label are shaped in a similar manner.

19. Apparatus as set forth in claim 13 wherein the averaging means, the decomposing means and the forming means are all coupled to and responsive to means for inputting commands from a user of the system.

20. Apparatus as set forth in claim 13 and further including means for storing and retrieving at least the second and the third sets for subsequent use by the apparatus.

21. Apparatus as set forth in claim 13 wherein the means for inputting is coupled to means for providing data expressive of predetermined symbols comprised of strokes having shapes selected for emphasizing differences between the symbols while de-emphasizing similarities between the symbols.

22. A method of generating a set of prototype symbols for use in a handwriting recognition system, comprising the steps of:
   inputting a plurality of strokes each of which is a constituent stroke of a symbol or symbols;
   forming from the inputted strokes a first set comprised of one or more symbols; and
   averaging at least one characteristic of similarly formed symbols that are members of the first set to form a second set comprised of prototype symbols to which, during the use of the system, assemblages of input strokes are compared.

23. A method as set forth in claim 22 and further including the steps of:
   decomposing the prototype symbols of the second set into constituent strokes; and
   forming a third set comprised of the constituent strokes of the second set to which, during the use of the system, input strokes are compared.

24. A method as set forth in claim 23 wherein the step of forming a third set includes a step of averaging at least one characteristic of similarly formed constituent strokes of the second set of prototype symbols.

* * * * *